United States Patent
De Lima et al.

(10) Patent No.: US 12,004,529 B2
(45) Date of Patent: Jun. 11, 2024

(54) HIGH STEARIC ACID MARINADE

(71) Applicant: Bunge Loders Croklaan B.V., Wormerveer (NL)

(72) Inventors: Christopher Mark De Lima, Wormerveer (NL); Jun Ma, Wormerveer (NL); Karin Alicia Theron, Wormerveer (NL)

(73) Assignee: BUNGE LODERS CROKLAAN B.V., Wormerveer (NL)

( * ) Notice: Subject to any disclaimer, the term of this patent is extended or adjusted under 35 U.S.C. 154(b) by 683 days.

(21) Appl. No.: 16/485,893

(22) PCT Filed: Feb. 14, 2018

(86) PCT No.: PCT/EP2018/053695
§ 371 (c)(1),
(2) Date: Aug. 14, 2019

(87) PCT Pub. No.: WO2018/149884
PCT Pub. Date: Aug. 23, 2018

(65) Prior Publication Data
US 2020/0008440 A1 Jan. 9, 2020

(30) Foreign Application Priority Data
Feb. 15, 2017 (EP) ................................. 17275020

(51) Int. Cl.
*A23D 9/04* (2006.01)
*A23L 5/10* (2016.01)
*A23L 13/72* (2023.01)
*C11C 3/10* (2006.01)

(52) U.S. Cl.
CPC .................. *A23D 9/04* (2013.01); *A23L 5/10* (2016.08); *A23L 13/72* (2016.08); *C11C 3/10* (2013.01); *A23V 2002/00* (2013.01)

(58) Field of Classification Search
CPC .............. A23D 9/04; C11C 3/10; A23L 13/72
See application file for complete search history.

(56) References Cited

U.S. PATENT DOCUMENTS

| | | | |
|---|---|---|---|
| 4,292,338 A | 9/1981 | Ainger et al. | |
| 4,482,576 A | 11/1984 | Boot et al. | |
| 6,096,351 A | 8/2000 | Sassen | |
| 2010/0291267 A1* | 11/2010 | Nissing | A23L 13/65 426/72 |
| 2011/0262592 A1 | 10/2011 | Kang | |
| 2016/0302460 A1 | 10/2016 | Haindl et al. | |
| 2017/0071224 A1* | 3/2017 | Bhaggan | A23D 9/02 |
| 2017/0107446 A1* | 4/2017 | 'T Zand | C11B 1/025 |
| 2020/0037629 A1 | 2/2020 | De Lima et al. | |

FOREIGN PATENT DOCUMENTS

| | | |
|---|---|---|
| CN | 102215696 A | 10/2011 |
| CN | 103533840 A | 1/2014 |
| CN | 105779141 A | 7/2016 |
| CN | 106061277 A | 10/2016 |
| CN | 106061278 A | 10/2016 |
| EP | 2839750 A1 | 2/2015 |
| JP | H 03-172395 A | 7/1991 |
| JP | H 10-508496 A | 8/1998 |
| WO | 2008/104381 A1 | 9/2008 |
| WO | 2013/131861 A1 | 9/2013 |
| WO | 2013/131862 A1 | 9/2013 |
| WO | 2015/132206 A1 | 9/2015 |
| WO | 2015/150405 A1 | 10/2015 |

OTHER PUBLICATIONS

WO 2015/132206, Bhaggan et al., Sep. 11, 2015. (Year: 2015).*
International Search Report issued in corresponding International Patent Application No. PCT/EP2018/053695 dated Mar. 20, 2018.
Written Opinion issued in corresponding International Patent Application No. PCT/EP2018/053695 dated Mar. 20, 2018.
International Preliminary Report on Patentability issued in corresponding International Patent Application No. PCT/EP2018/053695 dated Aug. 20, 2019.
Adhikari et al., "Enzymatic and Chemical Interesterification of Rice Bran Oil, Sheaolein, and Palm Stearin and Comparative Study of Their Physicochemical Properties," Journal of Food Science, 77: C1284-C1291 (2012).
Extended European Search Report issued in related European Patent Application No. 17275020.0 dated Mar. 29, 2017.
"Confectionery Fats Handbook", Ralph E. Timms, 176 (2003).
Office Action issued in corresponding Brazilian application BR112019016653A2 dated Feb. 23, 2023.
Office action issued in corresponding Japanese application JP2019543036A dated Nov. 30, 2021.

* cited by examiner

Primary Examiner — Stephanie A Cox
(74) Attorney, Agent, or Firm — Morgan, Lewis & Bockius LLP

(57) ABSTRACT

A fat composition comprises: greater than 70% by weight stearic acid; from 5% to 20% by weight oleic acid; and from 1% to 10% by weight palmitic acid; said percentages of acids referring to acids bound as acyl groups in glycerides in the fat composition and being based on the total weight of C8 to C24 fatty acids; and greater than 40% by weight of StStSt triglycerides and greater than 10% by weight of $PSt_2$ triglycerides based on total triglycerides present in the composition, and a weight ratio of $PSt_2$:StStSt triglycerides of less than 0.5, wherein P is palmitic acid and St is stearic acid. The fat may be used in a marinade.

7 Claims, No Drawings

HIGH STEARIC ACID MARINADE

This invention relates to a fat composition, a marinade comprising the fat composition and a method for its production.

Shea oil (butter) is a fat obtained from the shea tree. The butter is sometimes fractionated to form a stearin fraction (shea stearin) and an olein fraction (shea olein). Shea products are used in cosmetics and in the food industry. Shea oil is relatively rich in stearic and oleic acids.

A marinade is a mixture of ingredients, in which meat, fish, or other food is soaked before cooking in order to flavour and/or soften it. Typically, marinades comprise oil, wine, spices, vegetables or similar ingredients. Marinades are usually applied to refrigerated food and the marinating process usually takes place at refrigerator temperatures of about 5° C. for a period of several hours.

Marinades are described in, for example, US 2016/302460.

Fats and oils are important components of food products and can be responsible for texture, mouthfeel and flavor attributes. For instance, the solid fat profile can affect properties such as flavor release and structure.

Fats and oils contain glycerides. Glycerides may be in the form of mono-, di- or triglycerides having one, two or three fatty acid acyl groups, respectively, bonded to a glycerol backbone. Triglycerides are the predominant type of glyceride in edible fats and oils.

Fats and oils are sometimes subjected to an interesterification process which randomises the fatty acid acyl residues amongst the glyceride molecules. This can alter the physical properties of the fat or oil. Usually, interesterification is carried out in order to effect complete randomisation of the fatty acid acyl groups.

U.S. Pat. No. 4,482,576 describes the directed interesterification of an edible oil. The process is carried out under low temperature conditions such that some of the oil is in the solid phase. This results in a product that does not have complete randomization of the fatty acid residues but has a partially randomised distribution of the fatty acids depending on the composition of the liquid and solid oil phases at the time of randomization.

There remains a need for improved marinades, in particular having good consistency and/or viscosity both at refrigeration temperatures and at room temperature, so that the marinade has sufficient flowability to be applied to food when taken out of a refrigerator, and to be reapplied at refrigerator temperatures, and yet which does not run off the food at higher room temperatures. In particular, there is a need for such marinades that do not contain hydrogenated fats.

According to the invention, there is provided a fat composition comprising:
greater than 70% by weight stearic acid;
from 5% to 20% by weight oleic acid; and
from 1% to 10% by weight palmitic acid;
said percentages of acids referring to acids bound as acyl groups in glycerides in the fat composition and being based on the total weight of C8 to C24 fatty acids; and
greater than 40% by weight of StStSt triglycerides and greater than 10% by weight of PSt$_2$ triglycerides based on total triglycerides present in the composition, and a weight ratio of PSt$_2$:StStSt triglycerides of less than 0.5, wherein P is palmitic acid and St is stearic acid.

The fat composition of the invention has been found to be particularly useful as a fat for a marinade. For example, the fat composition imparts good rheological properties to the marinade, generally in a blend with one or more liquid oils, allowing the marinade to be applied at refrigeration temperatures but to generally retain consistency at higher temperatures.

Also provided by the invention is a process for making the fat composition of the invention, which comprises chemically interesterifying a fat at a temperature of from 30 to 50° C.

Further provided by the invention is a marinade comprising the fat composition of the invention, preferably in an amount of from 1% to 99% by weight, and optionally one or more ingredients selected from herbs, spices and vegetables.

In another aspect, the invention provides the use of the fat composition of the invention in a marinade.

In a further aspect, the invention provides a method of preparing a food product which comprises contacting the marinade of the invention with food for cooking, preferably with raw meat, and cooking the marinated food.

The term "fat" refers to glyceride fats and oils containing fatty acid acyl groups and does not imply any particular melting point. The term "oil" is used synonymously with "fat". Fats predominantly comprise triglycerides.

Amounts of triglycerides specified herein are percentages by weight based on total triglycerides present in the fat composition. The notation triglyceride XYZ denotes triglycerides having fatty acid acyl groups X, Y and Z at any of the 1-, 2- and 3-positions of the glyceride. The notation A$_2$B includes both AAB and ABA, and AB$_2$ includes both ABB and BAB. Triglyceride content may be determined for example by GC (ISO 23275).

The term "fatty acid", as used herein, refers to straight chain saturated or unsaturated (including mono- and polyunsaturated) carboxylic acids having from 8 to 24 carbon atoms. A fatty acid having n carbon atoms and x double bonds may be denoted Cn:x. For example, palmitic acid may be denoted C16:0 and oleic acid may be denoted C18:1.

Percentages of fatty acids in compositions referred to herein include acyl groups in tri-, di- and mono-glycerides present in the glycerides as is customary terminology in the art and are based on the total weight of C8 to C24 fatty acids. The fatty acid profile (i.e., composition) may be determined, for example, by fatty acid methyl ester analysis (FAME) using gas chromatography according to ISO 15304.

The fat composition of the invention comprises greater than 70% by weight stearic acid. Preferably, the fat composition comprises from 70% to 80% by weight stearic acid, such as from 72% to 79% by weight stearic acid.

The fat composition of the invention comprises from 5% to 20% by weight oleic acid. Preferably, the fat composition comprises from 6% to 18% by weight oleic acid, such as from 8 to 16% by weight oleic acid.

The fat composition of the invention comprises from 1% to 10% by weight palmitic acid, preferably from 4% to 8% by weight palmitic acid.

The linoleic (C18:2) acid content of the fat compositions of the invention is preferably up to 5% by weight, such as from 0.5% to 3% by weight.

The fat compositions of the invention preferably contain less than 10% by weight of total C20 to C24 fatty acids, more preferably less than 8% by weight, such as less than 5% by weight. Additionally, or alternatively, the fat compositions of the invention may comprise less than 1% by weight C8 to C14 fatty acids.

A preferred fatty acid composition for the fat compositions of the invention therefore comprises, based on the total weight of C8 to C24 fatty acids:
from 70% to 80% by weight stearic acid;

from 5% to 18% by weight oleic acid;
from 4% to 8% by weight palmitic acid;
up to 5% by weight linoleic (C18:2) acid;
and preferably less than 5% of total C20 to C24 fatty acids and/or less than 1% by weight total C8 to C14 fatty acids.

The fat composition of the invention comprises greater than 40% by weight of StStSt triglycerides and greater than 10% by weight of $PSt_2$ triglycerides based on total triglycerides present in the composition, and a weight ratio of $PSt_2$:StStSt triglycerides of less than 0.5.

Preferably, the fat composition comprises from 45% to 65% by weight of StStSt triglycerides.

The weight ratio of $PSt_2$:StStSt triglycerides is preferably in the range of from 0.15 to 0.4, more preferably from 0.20 to 0.35.

Preferably, the fat composition has a $P_2St$ content of from 0.5% to 2% by weight.

The PPP content of the fat compositions of the invention is preferably less than 2% by weight, more preferably less than 1% by weight.

The POP content of the fat compositions is preferably less than 2% by weight, more preferably less than 1% by weight.

The OOO content of the fat compositions is preferably from 1% to 5% by weight.

Accordingly, a preferred triglyceride composition for the fat composition of the invention comprises:
from 45% to 65% by weight of StStSt triglycerides;
from 0.5% to 2% by weight $P_2St$ triglycerides;
less than 2% by weight PPP;
less than 2% by weight POP; and
from 1% to 5% by weight OOO,
wherein the weight ratio of $PSt_2$:StStSt triglycerides is in the range of from 0.15 to 0.4.

A most preferred fat composition of the invention therefore comprises based on the total weight of C8 to C24 fatty acids:
from 70% to 80% by weight stearic acid;
from 5% to 18% by weight oleic acid;
from 4% to 8% by weight palmitic acid;
up to 5% by weight linoleic (C18:2) acid;
and preferably less than 5% of total C20 to C24 fatty acids and/or less than 1% by weight total C8 to C14 fatty acids.
and has a triglyceride composition which comprises:
from 45% to 65% by weight of StStSt triglycerides;
from 0.5% to 2% by weight $P_2St$ triglycerides;
less than 2% by weight PPP;
less than 2% by weight POP; and
from 1% to 5% by weight OOO,
wherein the weight ratio of $PSt_2$:StStSt triglycerides is in the range of from 0.15 to 0.4.

The fat compositions of the invention are typically non-hydrogenated. The fat composition is usually derived from vegetable fats.

The fat compositions of the invention are preferably free of added trans fatty acids. Typically, the fat compositions have a trans fatty acid content of less than 1% by weight.

The fat compositions of the invention may be made from naturally occurring or synthetic fats, fractions of naturally occurring or synthetic fats, or mixtures thereof, that satisfy the requirements for fatty acid and triglyceride composition defined herein. A preferred composition of the invention comprises, consists essentially of, or consists of a stearin fraction of an interesterified shea olein. Alternatively, the fat composition may comprise, consist essentially of, or consist of a stearin fraction of an interesterified blend of fats selected from shea, shea olein, shea stearin, and mixtures thereof.

The fat composition of the invention preferably has a solid fat content defined by an N0 value of from 80 to 95 and an N35 of from 65 to 85. The compositions preferably also have an N20 of from 80 to 90. N10 is preferably also from 80 to 90. N40 is preferably from 60 to 80. N-values (Solid Fat content (SFC)) are determined using NMR spectroscopy according to the IUPAC 2.150a method.

The fat composition of the invention is preferably made by a process which comprises interesterifying a fat.

In one embodiment, interesterification may be enzymatic or chemical. Interesterification may be carried out at a temperature of from 80 to 120° C. in the presence of a basic catalyst such as sodium methoxide.

Alternatively, interesterification may be directed interesterification at a temperature of from 30 to 50° C. Directed interesterification in this way results in a non-random distribution of fatty acids across the triglycerides. Preferably, the interesterification is carried out chemically, more preferably using sodium methoxide as catalyst. The interesterification is preferably carried out for at least 200 hours, such as from 200 to 400 hours. The product of interesterification is fractionated, preferably dry fractionated. Dry fractionation is preferably carried out by cooling molten fat to 40° C. to 48° C. in 3 to 7 hours, holding for 2 to 8 hours at 40° C. to 48° C., cooling further to 37° C. to 44° C. in 5 to 10 hours and holding at this temperature for 5 to 10 hours.

The fat that is interesterified in the process of the invention is preferably shea, shea olein, shea stearin, and mixtures thereof, more preferably a shea olein. Shea olein having the required fatty acid composition can be produced by fractionation of shea oil (butter) by conventional methods such as dry fractionation and solvent fractionation.

Thus, one preferred process of the invention for making the fat composition of the invention, comprises chemically interesterifying a fat, preferably shea olein, at a temperature of from 30 to 50° C. in the presence of sodium methoxide for at least 200 hours, followed by dry fractionation to form a stearin fraction.

Another preferred process of the invention for making the fat composition of the invention comprises chemically interesterifying a fat, preferably a blend comprising shea olein and shea stearin, at a temperature of from 80 to 120° C. in the presence of sodium methoxide.

The fat composition of the invention is preferably used in a marinade. Therefore, the present invention also provides a marinade comprising from 1 to 99% by weight of the fat composition of the invention, preferably from 1% to 20% by weight.

Also provided by the invention is the use of a fat composition of the invention for improving the consistency of a marinade. Consistency can be compared, for example, using a Bostwick Consistometer (CSC Scientific Company, Inc).

Preferably, the fat in the marinade comprises or consists of a combination of the fat composition of the invention and one or more liquid oils (i.e., oils that are fully liquid at 20° C.). Such a combination is also referred to herein as a marinade oil blend. Suitable edible liquid oils include, for example, rapeseed oil, canola oil, sunflower oil, olive oil, soybean oil, safflower oil, sesame oil, peanut oil, coconut oil, palm oil and mixtures thereof. The marinade oil blend preferably comprises liquid oil in an amount of from 70% to 99% by weight, more preferably from 80% to 99% by weight, such as from 90% to 99% by weight. The marinade oil blend preferably comprises the fat composition of the invention in an amount of from 1% to 30% by weight, more preferably from 1% to 20% by weight, such as from 1% to 10% by weight, or from 1% to 5% by weight.

Marinades comprising the fat composition of the invention preferably comprise the marinade oil blend in an amount of from 50% to 99% by weight, and from 1 to 50% by weight of one or more further ingredients, preferably selected from herbs, spices, salt and vegetables. The marinade preferably comprises up to 20% by weight vegetables (e.g., garlic, onion, peppers (Capsicum)) and/or up to 15% by weight spices (e.g., chili, paprika, pepper (Piperaceae)). The marinade preferably comprises salt in an amount of from 1% to 10% by weight, such as from 2% to 6% by weight.

A preferred marinade according to the invention comprises:
from 1% to 20% by weight of the fat composition of the invention;
from 70% to 95% by weight of one or more liquid oils;
up to 20% by weight vegetables (e.g., garlic, onion, peppers (Capsicum));
up to 15% by weight spices (e.g., chili, pepper (Piperaceae)); and
from 1% to 10% by weight salt, such as from 2% to 6% by weight.

Marinades of the invention are prepared by a process comprising mixing a fat composition of the invention with one or more liquid oils and one or more ingredients selected from herbs, spices and vegetables. Preferably, the marinades are packaged, for example in a bottle or jar.

A method of preparing a food product comprises contacting the marinade of the invention with food for cooking, preferably with raw meat, and cooking the marinated food. Suitable foods for marinating with the marinade of the invention include, for example, chicken, turkey, duck, goose, beef, veal, pork, lamb, fish and bean curd.

The listing or discussion of an apparently prior-published document in this specification should not necessarily be taken as an acknowledgement that the document is part of the state of the art or is common general knowledge.

Preferences and options for a given aspect, embodiment, feature or parameter of the invention should, unless the context indicates otherwise, be regarded as having been disclosed in combination with any and all preferences and options for all other aspects, embodiments, features and parameters of the invention.

The following non-limiting examples illustrate the invention and do not limit its scope in any way. In the examples and throughout this specification, all percentages, parts and ratios are by weight unless indicated otherwise.

EXAMPLES

Example 1

5 kilogram shea olein was chemically interesterified by mixing with sodium methoxide at 90° C. to 110° C., followed by reaction at 37° C. to 44° C. for at least 200 hours. The interesterified product was dry fractionated at 37° C. to 44° C. The oil was first heated to 70° C. and then cooled down to 40° C. to 48° C. in 3 to 7 hours, held for 2 to 8 hours at 40° C. to 48° C. and cooled further to 37° C. to 44° C. in 5 to 10 hours and held at this temperature for 5 to 10 hours. The crystals formed were separated by means of filter pressing. The slurry was pressed using the following program: increase pressure from 0 to 24 bar in 60 minutes and squeeze at 24 bar for 30 minutes. In this way, about 18% stearin yield was obtained. The analytical results are shown in Table 1.

Example 2

5 kilogram of a blend of 60% by weight shea olein and 40% by weight shea stearin was chemically interesterified using sodium methoxide at 90° C. to 110° C. The interesterified product was dry fractionated at 37° C. to 44° C. The oil was first heated to 70° C. and then cooled down to 40° C. to 48° C. in 3 to 7 hours, held for 2 to 8 hours at 40° C. to 48° C. and cooled further to 37° C. to 44° C. in 5 to 10 hours and held at this temperature for 5 to 10 hours. The crystals formed were separated by means of filter pressing. The slurry was pressed using the following program: increase pressure from 0 to 24 bar in 60 minutes and squeeze at 24 bar for 30 minutes. In this way, about 12% stearin yield was obtained. The analytical results are shown in Table 1.

The stearin fractions obtained in Examples 1 and 2 are suitable for replacing hydrogenated oils and fats as crystallization/structuring agent.

The physical characteristics of different fat compositions and analytical data are given in the following Table 1:

|  | Example 1 | Example 2 | Fully hydrogenated Shea Olein | Fully hydrogenated Rapeseed Oil | Interesterified Shea Stearin* |
|---|---|---|---|---|---|
| C8:0 | 0 | 0 | 0 | 0.1 | 0 |
| C10:0 | 0 | 0 | 0 | 0.1 | 0 |
| C12:0 | 0.1 | 0.1 | 0.2 | 1.5 | 0.3 |
| C15:0 | 0 | 0 | 0 | 0.1 | 0 |
| C14:0 | 0.1 | 0.1 | 0.2 | 0.7 | 0.2 |
| C16:0 | 6.8 | 5.2 | 7.1 | 9.1 | 5 |
| C16:1C | 0 | 0 | 0 | 0 | 0 |
| C16:1T | 0 | 0 | 0 | 0 | 0 |
| C17:0 | 0.1 | 0.1 | 0.1 | 0.2 | 0.1 |
| C18:0 | 78.4 | 75.2 | 88.4 | 83.9 | 58.5 |
| C18:1 | 10 | 14.7 | 1.9 | 1.2 | 31.1 |
| C18:1T | 0.1 | 0.1 | 1.2 | 0.4 | 0 |
| C18:1C | 9.8 | 14.6 | 0.6 | 0.8 | 31.1 |
| C18:2 | 1.5 | 1.8 | 0.3 | 0.3 | 2.7 |
| C18:2T | 0.1 | 0.2 | 0.2 | 0.2 | 0 |
| C18:2C | 1.4 | 1.5 | 0 | 0.1 | 2.7 |
| C18:3 | 0.1 | 0 | 0 | 0 | 0 |
| C18:3T | 0 | 0 | 0 | 0 | 0 |
| C18:3C | 0 | 0 | 0 | 0 | 0 |
| Total Trans | 0.3 | 0.3 | 1.5 | 0.6 | 0 |
| C20:0 | 2.6 | 2.3 | 1.7 | 1.8 | 1.7 |
| C20:1C | 0.1 | 0.1 | 0 | 0 | 0.1 |
| C20:2C | 0 | 0 | 0 | 0 | 0 |
| C22:0 | 0.2 | 0.2 | 0.1 | 0.6 | 0.1 |
| C22:1 | 0 | 0 | 0 | 0 | 0 |
| C22:1T | 0 | 0 | 0 | 0 | 0 |
| C22:1C | 0 | 0 | 0 | 0 | 0 |
| C24:0 | 0.2 | 0.1 | 0.1 | 0.3 | 0.1 |
| C24:1C | 0 | 0 | 0 | 0 | 0 |
| MPP | 0 | 0 | 0 | 1.2 | 0 |
| MOM | 0 | 0 | 0 | 0 | 0 |
| PPP | 0.5 | 0 | 0.8 | 1.7 | 0 |
| MOP | 0.1 | 0 | 0 | 0 | 0 |
| MLP | 0.1 | 0 | 0 | 0 | 0 |
| PPSt | 1.4 | 0.9 | 3.9 | 3.4 | 0.7 |
| POP | 0.2 | 0 | 0.1 | 0 | 0.6 |
| PLP | 0.2 | 0.1 | 0.3 | 0.2 | 0.1 |
| PStSt | 17.1 | 12.5 | 13.6 | 15.5 | 5.7 |
| POSt | 0.5 | 1.5 | 0.1 | 0 | 5.7 |
| POO | 1.1 | 0.7 | 0.1 | 0.1 | 1.9 |
| PLSt | 0.2 | 0.2 | 0 | 0 | 0.7 |
| PLO | 0.7 | 0.4 | 0.2 | 0.5 | 0.7 |
| PLL | 0 | 0 | 0 | 0.2 | 0 |

-continued

|  | Example 1 | Example 2 | Fully hydrogenated Shea Olein | Fully hydrogenated Rapeseed Oil | Interesterified Shea Stearin* |
|---|---|---|---|---|---|
| StStSt | 60.3 | 50.1 | 73.5 | 71 | 20.6 |
| StOSt | 3.9 | 18.8 | 3.3 | 0.9 | 35.7 |
| StOO | 2.2 | 5.6 | 0.2 | 0 | 16.2 |
| StLSt | 0.2 | 0.8 | 0 | 0 | 2.3 |
| OOO | 2.8 | 1.9 | 0.2 | 0.4 | 2.8 |
| StLO | 0.9 | 1.2 | 0 | 0 | 2.5 |
| OLO | 1.2 | 0.6 | 0 | 0 | 0.6 |
| StLL | 0 | 0 | 0 | 0 | 0 |
| OLL | 0 | 3.7 | 0 | 0 | 1.3 |
| AStSt | 0.1 | 0 | 3.5 | 3.8 | 0 |
| AOSt | 4.7 | 0.8 | 0.2 | 0 | 1.3 |
| AOO | 0.3 | 0.2 | 0 | 0 | 0.3 |
| ALSt | 0 | 0 | 0 | 0 | 0 |
| Others | 0.5 | 0 | 0.1 | 1.1 | 0.2 |
| SUMSOS | 4.7 | 20.3 | 3.5 | 0.9 | 42 |

*standard interesterification in the presence of sodium methoxide at a temperature of about 90° C.-110° C.

In the above table:

Cx:y refers to a fatty acid having x carbon atoms and y double bonds;

C refers to cis fatty acids and T to trans fatty acids; levels determined by GC-FAME; M, O, P, St, L and A refer to myristic, oleic, palmitic, stearic, linoleic and arachidic acids, respectively;

triglyceride composition MPP, etc, was determined by GC (ISO 23275) and includes triglycerides having the same fatty acids in different positions e.g., MPP includes MPP and PMP; and SUMSOS refers to total SOS (S is stearic or palmitic acid and O is oleic acid).

The NMR profiles of the fat compositions of Example 1 and Example 2 are shown in the following table:

|  | Example 1 | Example 2 |
|---|---|---|
| US-N0 | 88 | 86 |
| US-N10 | 85 | 81 |
| US-N20 | 85 | 82 |
| US-N25 | 83 | 78 |
| US-N30 | 81 | 75 |
| US-N35 | 80 | 69 |
| US-N40 | 76 | 62 | where US-Nx refers to solid fat content determined by NMR on unstabilised fat at x° C.

The composition is also summarized in the following table:

|  | C16:0 | C18:0 | C18:1 | PSt2 | StStSt |
|---|---|---|---|---|---|
| Example 1 | 6.8 | 78.4 | 10 | 17.1 | 60.3 |
| Example 2 | 5.2 | 75.2 | 14.7 | 12.5 | 50.1 |
| Fully hydrogenated Shea Olein | 7.1 | 88.4 | 1.9 | 13.6 | 73.5 |
| Fully hydrogenated Rapeseed Oil | 9.1 | 83.9 | 1.2 | 15.5 | 71 |
| Interesterified Shea Stearin | 5 | 58.5 | 31.1 | 5.7 | 20.6 |

Example 3

The following five marinade oil blends were prepared for evaluating the properties of a structured marinade oil prepared with fully hydrogenated shea olein, fully hydrogenated rapeseed oil and interesterified shea stearin compared to a structured marinade oil blend prepared as in Example 1 and Example 2. The oil blends were heated to 75° C. and passed through a scraped surface heat exchanger and pin-rotor. The viscosity of the products was controlled by controlling the outlet temperature of the blends (8-10° C.). The resultant partially crystallized blends were collected and left to stand at room temperature (ca. 20° C.) for 24 hours.

|  | Composition* |
|---|---|
| Marinade oil blend A | 2.5% Example 1 + 97.5% Rapeseed |
| Marinade oil blend B | 2.5% Example 2 + 97.5% Rapeseed |
| Marinade oil blend C | 2% fully hydrogenated shea olein + 98% Rapeseed |
| Marinade oil blend D | 2% fully hydrogenated rapeseed oil + 98% Rapeseed |
| Marinade oil blend E | 4% Insteresterified shea stearin + 96% Rapeseed |

*amounts of hardstock and liquid oil were selected to achieve a similar consistency in the product which is acceptable for a marinade

Example 4

The consistency of the marinade oil blends stored at 4° C. and 20° C. was compared in duplicate using a Bostwick Consistometer. The results were reported as the distance travelled (cm) in 30 seconds. The difference between the scores at 4° C. and 20° C. was calculated.

|  | Difference cm |
|---|---|
| Marinade oil blend A | 1.6 |
| Marinade oil blend B | 1.3 |
| Marinade oil blend C | 1.6 |
| Marinade oil blend D | 0.9 |
| Marinade oil blend E | 3.6 |

The hydrogenated samples (marinade oil blend C and D) and marinade oil blend B (Example 2) and A (Example 1) performed the best. Marinade oil blend E performed the worst. Both marinade oil blend B and marinade oil blend A could successfully be used in oil-based marinades.

Example 5

The thickness of the marinade oil blends stored at 4° C. and 20° C. was visually evaluated on a scale of 0 (water) to 10 (peanut butter) by a qualified panel of 6 people. The difference between the scores at 4° C. and 20° C. was calculated. The hydrogenated samples (marinade oil blend C and D) performed the best, followed by marinade oil blend B (Example 2) and A (Example 1). Marinade oil bland E performed the worst. Both marinade oil blend A and marinade oil blend B could successfully be used in oil-based marinades.

Example 6

Two different marinades were prepared using the marinade oil blends. The formulations are shown in the table below.

| Formulation 1: Italian marinade | Formulation 2: Spicy marinade |
|---|---|
| 80% Marinade oil | 70% Marinade oil |
| 10% Vegetables (Garlic, Onion) | 10% Vegetables (Bell pepper, Garlic, Red onion) |
| 6% Herbs (Oregano, Basil, Thyme) | 10% Spices (Chilli, Pepper, Coriander, Cumin) |
| 4% Salt | 5% Herbs (Coriander leaves) |
| | 5% Salt |

The invention claimed is:

1. A marinade comprising from 50 to 99% by weight of a marinade oil blend and from 1 to 50% by weight of one or more other ingredients selected from herbs, spices, salt and vegetables, wherein the marinade oil blend comprises:
   (i) from 1 to 10% by weight of a fat composition of comprising:
   from 72% to 79% by weight stearic acid;
   from 8% to 16% by weight oleic acid; and
   from 4% to 8% by weight palmitic acid;
   the percentages of the acids referring to acids bound as acyl groups in glycerides in the fat composition and being based on the total weight of C8 to C24 fatty acids; and
   from 45% to 65% by weight of StStSt triglycerides and greater than 10% by weight of $PSt_2$ triglycerides based on total triglycerides present in the composition,
   a weight ratio of $PSt_2$:StStSt triglycerides from 0.20 to 0.35,
   from 0.5% to 2% by weight of $P_2St$ triglycerides, and less than 1% by weight of PPP triglycerides,
   wherein P is palmitic acid and St is stearic acid, and
   wherein the fat composition has an N0 value of from 80 to 95, an N10 value of from 80 to 90, an N20 value of from 80 to 90, an N35 value of from 65 to 85, and an N40 value of from 60 to 80, and
   (ii) from 90 to 99% by weight of liquid oil, wherein the liquid oil is selected from rapeseed oil, canola oil, sunflower oil, olive oil, soybean oil, safflower oil, sesame oil, peanut oil, coconut oil, palm oil and mixtures thereof.

2. The marinade as claimed in claim 1, wherein the marinade comprises up to 20% by weight vegetables, up to 15% by weight spices and from 1% to 10% by weight salt.

3. The marinade as claimed in claim 1, wherein the fat composition comprises a stearin fraction of an interesterified shea olein.

4. The marinade as claimed in claim 1, wherein the fat composition comprises a stearin fraction of an interesterified blend of fats selected from shea, shea olein, shea stearin, and mixtures thereof.

5. The marinade as claimed in claim 1, wherein the marinade comprises from 2 to 6% by weight salt.

6. A method of preparing a food product which comprises contacting the marinade of claim 1 with food for cooking and cooking the marinated food.

7. The method as claimed in claim 6, wherein the food contacted for cooking is raw meat.

* * * * *